(12) United States Patent
Aoki

(10) Patent No.: US 10,847,820 B2
(45) Date of Patent: Nov. 24, 2020

(54) FUEL CELL SYSTEM

(75) Inventor: Tetsuya Aoki, Yokosuka (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 948 days.

(21) Appl. No.: 14/001,373

(22) PCT Filed: Feb. 23, 2012

(86) PCT No.: PCT/JP2012/054404
§ 371 (c)(1),
(2), (4) Date: Aug. 23, 2013

(87) PCT Pub. No.: WO2012/117937
PCT Pub. Date: Sep. 7, 2012

(65) Prior Publication Data
US 2013/0330646 A1    Dec. 12, 2013

(30) Foreign Application Priority Data
Mar. 1, 2011  (JP) .................................. 2011-043862

(51) Int. Cl.
*H01M 8/04291*  (2016.01)
*H01M 8/04119*  (2016.01)
(Continued)

(52) U.S. Cl.
CPC ..... *H01M 8/04291* (2013.01); *H01M 8/0485* (2013.01); *H01M 8/04119* (2013.01); *H01M 8/04529* (2013.01); *H01M 8/04753* (2013.01); *H01M 8/04641* (2013.01); *H01M 2008/1095* (2013.01); *H01M 2250/20* (2013.01); *Y02T 90/40* (2013.01)

(58) Field of Classification Search
None
See application file for complete search history.

(56) References Cited

U.S. PATENT DOCUMENTS 9,246,182 B2 *   1/2016   Matsumoto ....... H01M 8/04619
2006/0263653 A1  11/2006  Sinha et al.

FOREIGN PATENT DOCUMENTS

EP    1 858 102 A1    11/2007
EP    2 270 910 A1     1/2011
(Continued)

OTHER PUBLICATIONS

Supplementary European Search Report dated Jul. 17, 2014, 6 pgs.
Canadian Office Action dated Jul. 24, 2014, 3 pgs.

*Primary Examiner* — Tracy M Dove
(74) *Attorney, Agent, or Firm* — Foley & Lardner LLP

(57) ABSTRACT

A fuel cell system for generating power by supplying a reaction gas to a fuel cell includes a wet state detection unit configured to detect a wet state of an electrolyte membrane of the fuel cell, a steady time target wet state setting unit configured to set a steady time target wet state of the electrolyte membrane during a steady operation of the fuel cell system based on an operating condition of the fuel cell system, and a transient time target wet state setting unit configured to set a transient time target wet state so that the wet state of the electrolyte membrane gradually changes from a wet state detected before a transient operation starts to the steady time target wet state during the transient operation in which the operating condition of the fuel cell system changes.

21 Claims, 16 Drawing Sheets

(51) Int. Cl.
*H01M 8/04828* (2016.01)
*H01M 8/04492* (2016.01)
*H01M 8/04746* (2016.01)
*H01M 8/1018* (2016.01)
*H01M 8/04537* (2016.01)

(56) References Cited

FOREIGN PATENT DOCUMENTS

| | | |
|---|---|---|
| EP | 2 355 219 A1 | 8/2011 |
| JP | 2002-352827 A | 12/2002 |
| JP | 2006-228629 A | 8/2006 |
| JP | 2007-48531 A | 2/2007 |
| JP | 2007-172971 A | 7/2007 |
| JP | 2011-28937 A | 2/2011 |
| WO | WO 2010/053027 A1 | 5/2010 |

* cited by examiner

FUEL CELL SYSTEM

FIELD OF THE INVENTION

This invention relates to a fuel cell system.

BACKGROUND

In a conventional fuel cell system disclosed in JP2002-352827A, a wet state of an electrolyte membrane is controlled in accordance with an operating condition of the fuel cell system.

SUMMARY

However, in the above conventional fuel cell system, a transient property of the wet state of the electrolyte membrane was not considered in controlling the wet state of the electrolyte membrane. Thus, there has been a problem that a deviation from a target wet state of the electrolyte membrane becomes larger during a transient operation in which the operating condition of the fuel cell system changes and a flow rate of a reaction gas transiently largely changes to deteriorate fuel economy and sound vibration performance.

The present invention was developed in view of such a problem and an object thereof is to suppress the deterioration of fuel economy and sound vibration performance during a transient operation.

To achieve the above object, one aspect of the present invention is directed to a fuel cell system, comprising a wet state detection means for detecting a wet state of an electrolyte membrane of a fuel cell, a steady time target wet state setting means for setting a target wet state of the electrolyte membrane during a steady operation of the fuel cell system as a steady time target wet state based on an operating condition of the fuel cell system, and a transient time target wet state setting means for setting a transient time target wet state so that the wet state of the electrolyte membrane gradually changes from a wet state detected before a transient operation starts to the steady time target wet state during the transient operation in which the operating condition of the fuel cell system changes.

An embodiment and advantages of the present invention are described in detail below with reference to the accompanying drawings.

DETAILED DESCRIPTION

First Embodiment

A fuel cell is configured such that an electrolyte membrane is sandwiched between an anode electrode (fuel electrode) and a cathode electrode (oxidant electrode), and generates power by supplying an anode gas (fuel gas) containing hydrogen to the anode electrode and a cathode gas (oxidant gas) containing oxygen to the cathode electrode. Electrode reactions which proceed in both the anode electrode and the cathode electrode are as follows.

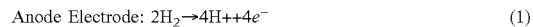

$$\text{Anode Electrode: } 2H_2 \rightarrow 4H^+ + 4e^- \quad (1)$$

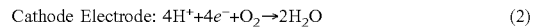

$$\text{Cathode Electrode: } 4H^+ + 4e^- + O_2 \rightarrow 2H_2O \quad (2)$$

The fuel cell generates an electromotive force of about 1 volt by these electrode reactions (1), (2).

In the case of using such a fuel cell as a drive source for automotive vehicle, a fuel cell stack in which several hundreds of fuel cells are laminated is used since required power is large. Then, power for driving a vehicle is derived by configuring a fuel cell system for supplying an anode gas and a cathode gas to the fuel cell stack.

Figure 1:
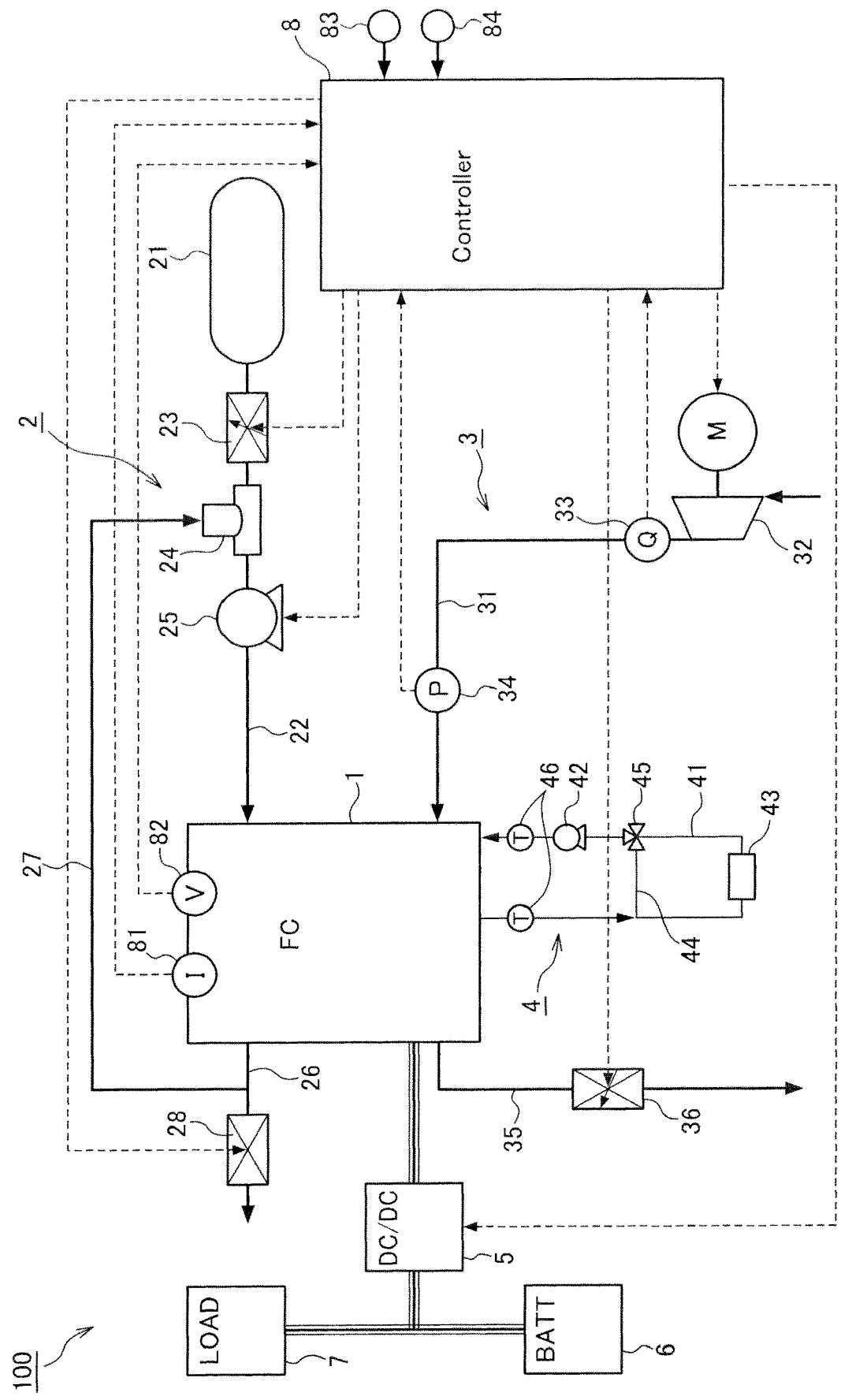
FIG. 1 is a schematic configuration diagram of a fuel cell system.

FIG. 1 is a schematic configuration diagram of a fuel cell system 100 according to the first embodiment of the present invention.

The fuel cell system 100 includes a fuel cell stack 1, an anode gas supply/discharge device 2, a cathode gas supply/discharge device 3, a cooling device 4, a DC/DC converter 5, a battery 6, an electrical load 7 and a controller 8.

The fuel cell stack 1 is such that a plurality of fuel cells are laminated, and generates power necessary to drive a vehicle upon receiving the supply of the anode gas and the cathode gas.

The anode gas supply/discharge device 2 includes a high-pressure tank 21, an anode gas supply passage 22, a pressure reducing valve 23, an ejector 24, a circulation pump 25, an anode gas discharge passage 26, an anode gas reflux passage 27 and a purge valve 28.

The high-pressure tank 21 stores the anode gas to be supplied to the fuel cell stack 1 while keeping it in a high-pressure state.

The anode gas supply passage 22 is a passage in which the anode gas to be supplied to the fuel cell stack 1 flows, one end thereof is connected to the high-pressure tank 21 and the other end thereof is connected to the fuel cell stack 1.

The pressure reducing valve 23 is provided in the anode gas supply passage 22. The opening of the pressure reducing valve 23 is controlled by the controller 8 to reduce the pressure of the anode gas flowed out to the anode gas supply passage 22 from the high-pressure tank 21 to a predetermined pressure.

The ejector 24 is provided downstream of the pressure reducing valve 23 in the anode gas supply passage 22. The anode gas reflux passage 27 for returning an anode off-gas containing unreacted hydrogen and discharged to the anode gas discharge passage 26 to the anode gas supply passage 22 is connected to the ejector 24. The ejector 24 mixes the anode gas supplied form the high-pressure tank 21 and the anode off-gas returned through the anode gas reflux passage 27 and supplies the mixed gas to the fuel cell stack 1.

The circulation pump 25 is provided downstream of the ejector 24 in the anode gas supply passage 22. The rotation speed of the circulation pump 25 is controlled by the controller 8 so that the anode off-gas discharged to the anode gas discharge passage 26 flows in the anode gas reflux passage 27 and returns to the anode gas supply passage 22.

The anode gas discharge passage 26 is a passage in which the anode off-gas discharged from the fuel cell stack 1 flows and one end thereof is connected to the fuel cell stack 1.

One end of the anode gas reflux passage 27 is connected to the anode gas discharge passage 26 and the other end thereof is connected to the ejector 24 provided in the anode gas supply passage 22.

The purge valve 28 is provided in the anode gas discharge passage 26 downstream of a connecting part of the anode gas discharge passage 26 and the anode gas reflux passage 27. The purge valve 28 is opened and closed by the controller 8 if necessary to discharge the anode off-gas to outside air.

The cathode gas supply/discharge device 3 includes a cathode gas supply passage 31, a compressor 32, a flow rate sensor 33, a pressure sensor 34, a cathode gas discharge passage 35 and a pressure regulating valve 36.

The cathode gas supply passage 31 is a passage in which the cathode gas to be supplied to the fuel cell stack 1 flows, and one end thereof is connected to the fuel cell stack 1.

The compressor 32 is provided in the cathode gas supply passage 31 and supplies sucked air as the cathode gas to the fuel cell stack 1.

The flow rate sensor 33 is provided downstream of the compressor 32 in the cathode gas supply passage 31. The flow rate sensor 33 detects a flow rate of the cathode gas flowing in the cathode gas supply passage 31.

The pressure sensor 34 is provided downstream of the compressor 32 in the cathode gas supply passage 31. The pressure sensor 34 detects a pressure of the cathode gas flowing in the cathode gas supply passage 31.

The cathode gas discharge passage 35 is a passage in which the cathode off-gas discharged from the fuel cell stack 1 flows, and one end thereof is connected to the fuel cell stack 1.

The pressure regulating valve 36 is provided in the cathode gas supply passage 35. The opening of the pressure regulating valve 36 is controlled by the controller 8 to reduce the pressure of the cathode gas to be supplied to the fuel cell stack 1.

The cooling device 4 includes a cooling water circulation passage 41, a cooling water circulation pump 42, a radiator 43, a bypass passage 44, a three-way valve 45 and a temperature sensor 46.

The cooling water circulation passage 41 is a passage in which cooling water for cooling the fuel cell stack 1 flows.

The cooling water circulation pump 42 is provided in the cooling water circulation passage 41 to circulate the cooling water.

The radiator 43 is provided in the cooling water circulation passage 41 to cool the cooling water discharged from the fuel cell stack 1.

One end of the bypass passage 44 is connected to the cooling water circulation passage 41 and the other end thereof is connected to the three-way valve 45 so that the cooling water can be circulated while bypassing the radiator 43.

The three-way valve 45 is provided in the cooling water circulation passage 41. The three-way valve 45 switches cooling water circulation paths according to the temperature of the cooling water. Specifically, when the temperature of the cooling water is relatively high, the cooling water circulation paths are so switched that the cooling water discharged from the fuel cell stack 1 is supplied to the fuel cell stack 1 again via the radiator 43. Conversely, when the temperature of the cooling water is relatively low, the cooling water circulation paths are so switched that the cooling water discharged from the fuel cell stack 1 is supplied to the fuel cell stack 1 again by flowing in the bypass passage 44 without via the radiator 43.

The temperature sensor 46 is provided in the cooling water circulation passage 41 to detect a temperature of the cooling water flowing in the cooling water circulation passage 41.

The DC/DC converter 5 is electrically connected to the fuel cell stack 1. The DC/DC converter 5 is a bidirectional voltage converter for increasing and decreasing a voltage of the fuel cell system 1, obtains a direct-current output from a direct-current input and converts an input voltage into an arbitrary output voltage.

The battery 6 is a secondary battery capable of charging and discharging such as a lithium-ion secondary battery. The battery 6 is electrically connected to the DC/DC converter 5 and the electrical load 7.

The electrical load 7 is electrically connected to the DC/DC converter 5 and the battery 6 and consumes power. The electrical load 7 is, for example, a motor for driving the vehicle.

The controller 8 is configured by a microcomputer including a central processing unit (CPU), a read only memory (ROM), a random access memory (RAM) and an input/output interface (I/O interface).

Signals for detecting an operating condition of the fuel cell system 100 such as those from a current sensor 81 for detecting an output current of the fuel cell stack 1, a voltage sensor 82 for detecting an output voltage of the fuel cell stack 1, an accelerator stroke sensor 83 for detecting a depressed amount of an accelerator pedal (hereinafter, referred to as an "accelerator operation amount), an SOC sensor 84 for detecting a state of charge of the battery 6 and the like in addition to the flow rate sensor 33, the pressure sensor 34 and the temperature sensor 46 described above are input to the controller 8. The controller 8 calculates a target output of the fuel cell stack 1 based on these input signals and controls the flow rates of the anode gas and the cathode gas supplied to the fuel cell stack 1.

Further, the controller 8 controls the fuel cell system 100 to adjust a moisture content in the electrolyte membrane of each fuel cell constituting the fuel cell stack 1 and set an optimal wet state of the electrolyte membranes corresponding to the output of the fuel cell stack 1.

Figure 2:
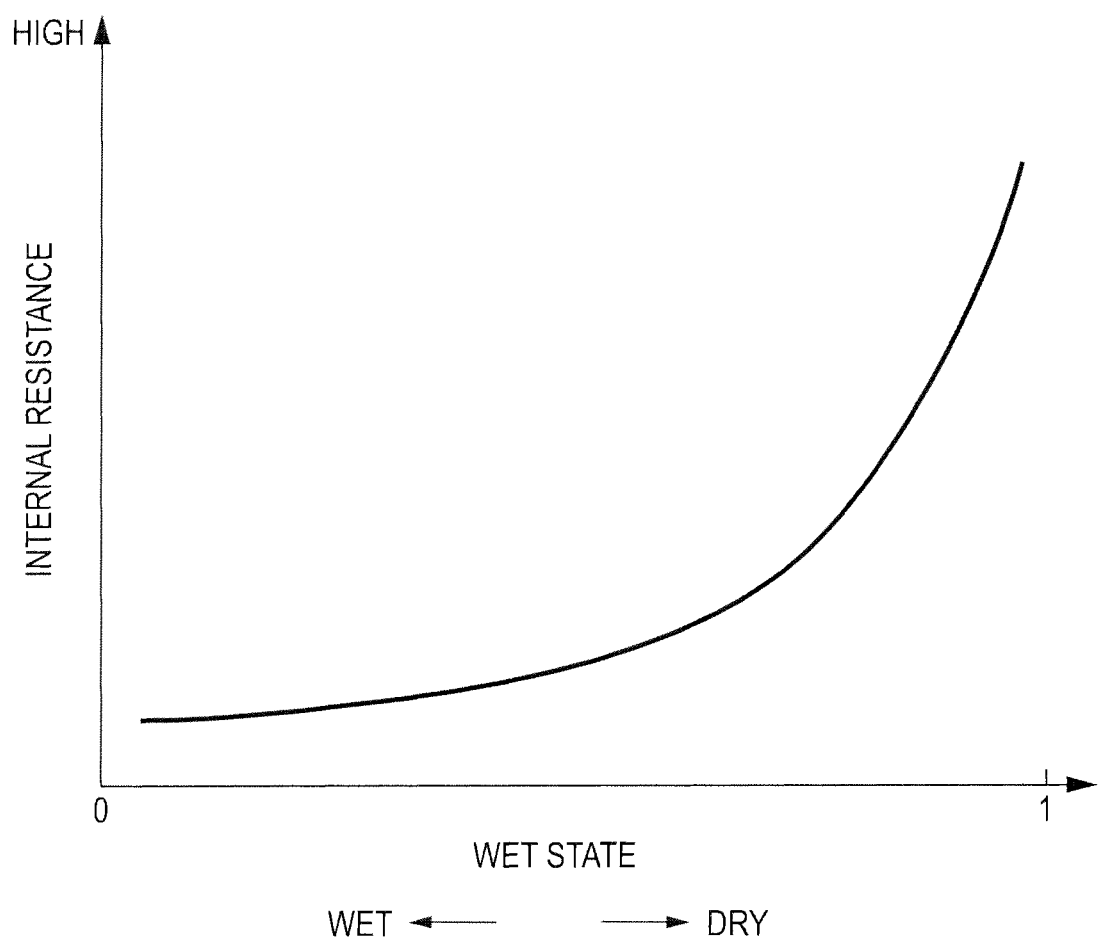
FIG. 2 is a graph showing a relationship between a wet state of an electrolyte membrane and internal resistance of a fuel cell stack.

FIG. 2 is a graph showing a relationship between the wet state of the electrolyte membrane and internal high frequency resistance (HFR: High Frequency Resistance) (hereinafter, referred to as "internal resistance") of the fuel cell stack 1. In this embodiment, the wet state of the electrolyte membrane is expressed as a numerical value in the range of 0 to 1 depending on a degree of wetness of the electrolyte membrane and 1 indicates a state where the electrolyte membrane is completely dry.

As shown in FIG. 2, the wet state of the electrolyte membrane is known to be correlated to the internal resistance of the fuel cell stack 1. The lower the moisture content in the electrolyte membrane and the drier the electrolyte membrane, the higher the internal resistance of the fuel cell stack 1. Thus, the wet state of the electrolyte membrane of the fuel cell can be indirectly grasped by detecting the internal resistance of the fuel cell stack 1.

Accordingly, in this embodiment, the internal resistance of the fuel cell stack 1 is detected through calculation by an alternating current impedance method. Specifically, an alternating current is superimposed on an output current of the fuel cell stack 1 by controlling the DC/DC converter 5 and a voltage value of the fuel cell stack 1 at that time is detected by the voltage sensor 82. A voltage amplitude of the superimposed alternating current is calculated based on that voltage value and the internal resistance of the fuel cell is calculated by dividing that voltage amplitude by a current amplitude of the superimposed alternating current.

Then, the moisture content in the electrolyte membrane is so adjusted that the internal resistance falls within a range of internal resistance required for a steady operation of the fuel cell system 100 at a target output (hereinafter, referred to as "targeted internal resistance").

In other words, the range of the targeted internal resistance is a range of the wet state of the electrolyte membrane required for the steady operation of the fuel cell system 100 at the target output (hereinafter, referred to as "targeted wet state of the electrolyte membrane"). Thus, if the range of the targeted wet state of the electrolyte membrane is set based on the target output of the fuel cell stack 1, the range of the targeted internal resistance can be set based on the range of the targeted wet state of the electrolyte membrane from a correlation between the wet state and the internal resistance.

Figure 3:
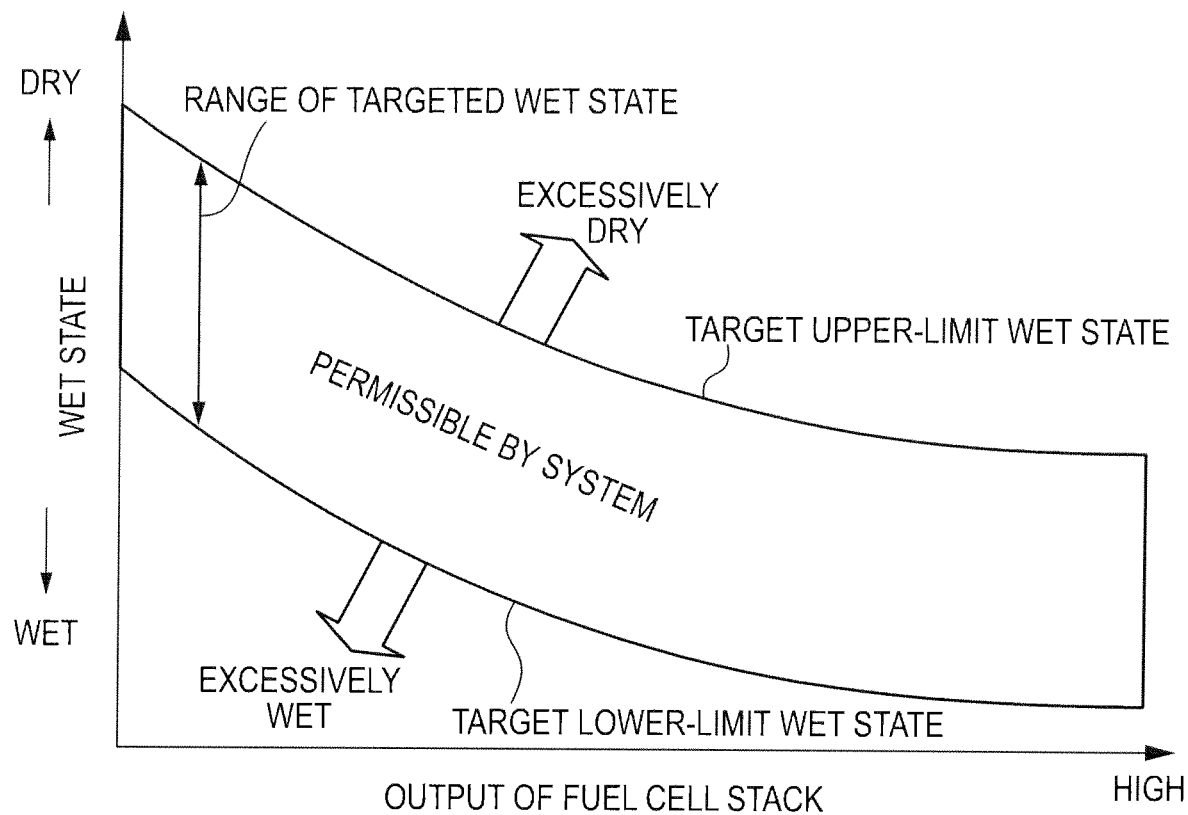
FIG. 3 is a graph showing a range of a targeted wet state of the electrolyte membrane in relation to an output of the fuel cell stack.

FIG. 3 is a graph showing the range of the targeted wet state of the electrolyte membrane in relation to the output of the fuel cell stack 1. An upper limit and a lower limit of the range of the targeted wet state of the electrolyte membrane are referred to as a "target upper-limit wet state" and a "target lower-limit wet state" below.

As shown in FIG. 3, the range of the targeted wet state of the electrolyte membrane changes according to the output of the fuel cell stack 1, and the target upper-limit wet state and the target lower-limit wet state decrease with an increase in the output of the fuel cell stack 1. Thus, the fuel cell system 100 needs to be controlled to increase the moisture content in the electrolyte membrane with an increase in the output of the fuel cell stack 1.

As a method for adjusting the moisture content in the electrolyte membrane, there are methods for controlling the flow rate and pressure of the cathode gas, the temperature of the cooling water and the like. In this embodiment, the moisture content in the electrolyte membrane is adjusted by controlling the flow rate of the cathode gas. As the flow rate of the cathode gas is increased, the moisture content in the electrolyte membrane decreases and the electrolyte membrane becomes drier.

Accordingly, the flow rate of the cathode gas needs to be so controlled that the output of the fuel cell stack 1 becomes a target output and the wet state of the electrolyte membrane falls within the range of the targeted wet state of the electrolyte membrane during a transient operation of the fuel cell system 100, i.e. when the accelerator operation amount and the like change to change the target output.

Figure 16:
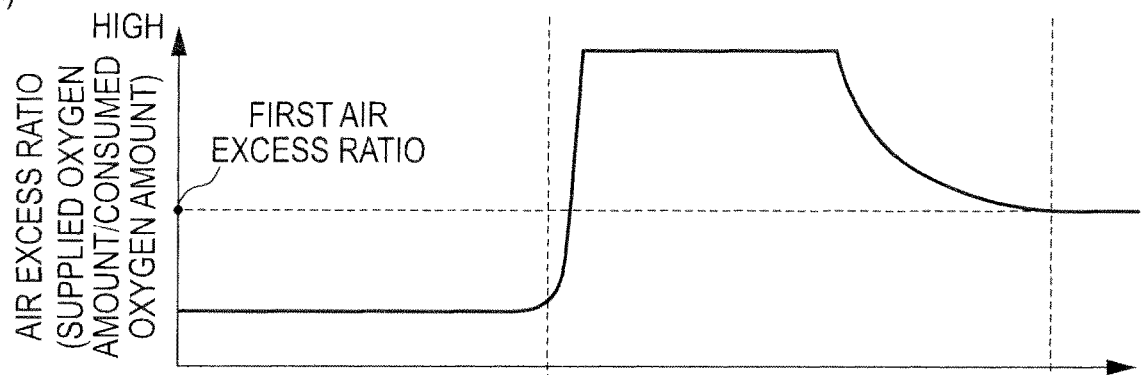
Figure 16:
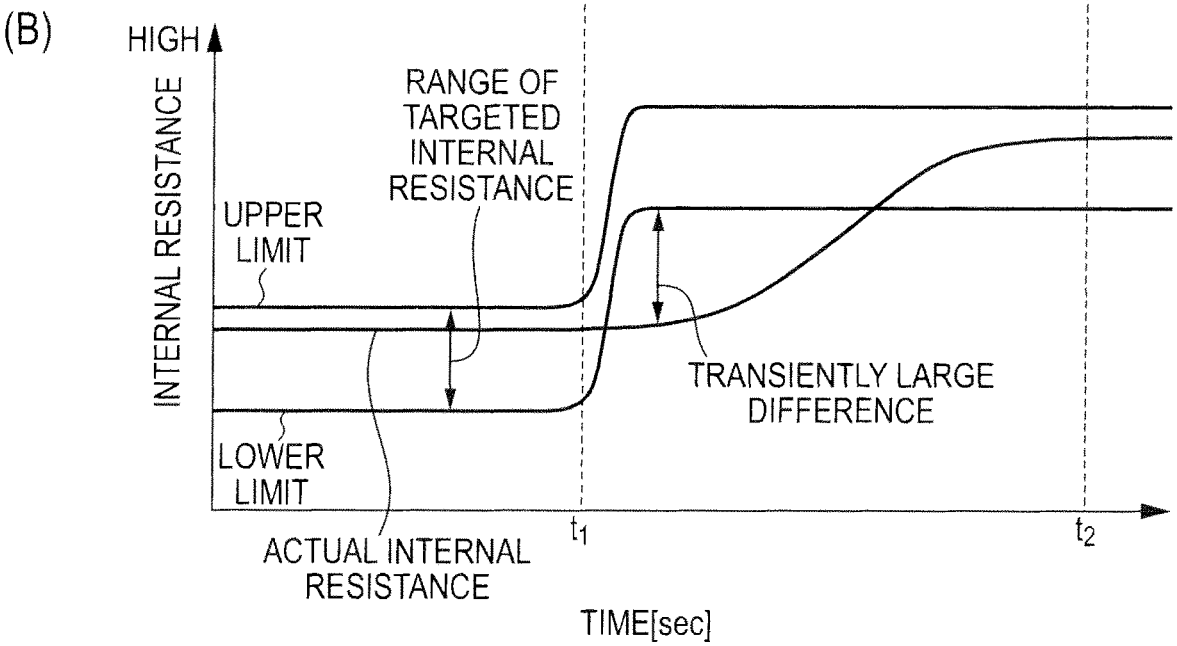

However, there is a difference between a transient property of the wet state of the electrolyte membrane and that of the output of the fuel cell stack 1 and the wet state of the electrolyte membrane moderately changes at a later timing than the stack output. Thus, it was found that the cathode gas was excessively supplied during a transient operation of the fuel cell system 100 and one or both of fuel economy and sound vibration performance was deteriorated if the range of the targeted wet state of the electrolyte membrane was simply set based on the target output of the fuel cell stack 1 and the range of the targeted internal resistance was set based on that targeted wet state of the electrolyte membrane. Reference is made to FIG. 16 for this problem which occurs during the transient operation of the fuel cell system 100.

FIG. 16 are graphs showing a problem which occurs during the transient operation of the fuel cell system 100. FIG. 16(A) shows an air excess ratio (=supplied oxygen amount/consumed oxygen amount) and FIG. 16(B) shows the internal resistance of the fuel cell stack 1.

It is assumed that the operating condition of the fuel cell system 100 changes and the target output of the fuel cell stack 1 decreases at time t1.

As shown in FIG. 16(A), an air excess ratio at which the decreased target output can be output at time t1 and the internal resistance can fall within the range of the internal resistance required for the steady operation of the fuel cell system 100 at that target output (range of the targeted internal resistance) is a first air excess ratio shown at and after time t2.

Here, a case is considered where the target output of the fuel cell stack 1 changes stepwise. In this case, if the range of the targeted internal resistance is finally set based on the target output of the fuel cell stack having changed stepwise at time t1, the range of the targeted internal resistance also changes stepwise as shown in FIG. 16(B).

However, as described above, there is a difference between the transient property of the wet state of the electrolyte membrane and that of the output of the fuel cell stack 1 and the wet state of the electrolyte membrane moderately changes at a later timing than the stack output. Thus, if the range of the targeted internal resistance is changed stepwise in accordance with a change in the target output of the fuel cell stack 1 in this way, a difference between the internal resistance and the targeted internal resistance transiently becomes larger.

Thus, a feedback control works to reduce the difference between the internal resistance and the targeted internal resistance, wherefore the cathode gas is excessively supplied and the air excess ratio becomes larger than the first air excess ratio in a time interval between time t1 and time t2. Hence, one or both of fuel economy and sound vibration performance are deteriorated.

Accordingly, in this embodiment, the flow rate of the cathode gas is controlled to match the transient property of the wet state of the electrolyte membrane during the transient operation of the fuel cell system 100. That is, the range of the targeted internal resistance is changed to correspond to an actual change in the wet state of the electrolyte membrane during the transient operation by limiting a change rate of the range of the targeted internal resistance without changing this range stepwise. Since it can be suppressed in this way that the cathode gas is supplied at a flow rate more than necessary for the steady operation at the target output, the deterioration of one or both of fuel economy and sound vibration performance can be suppressed. An electrolyte membrane wet state control according to this embodiment is described below.

Figure 4:
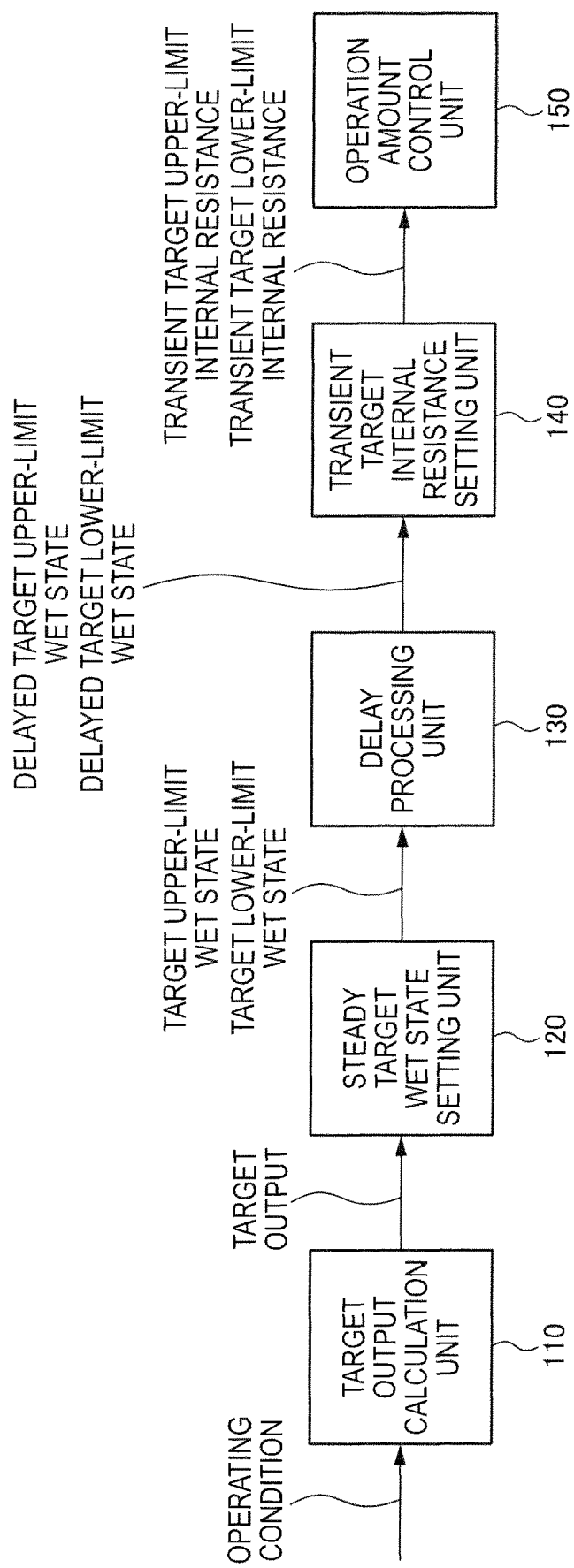
FIG. 4 is a block diagram showing an electrolyte membrane wet state control according to the first embodiment.

FIG. 4 is a block diagram showing the electrolyte membrane wet state control according to this embodiment.

A target output calculation unit 110 calculates the target output of the fuel cell stack 1 based on the operating condition of the fuel cell system 100. Basically, the larger the accelerator operation amount, the higher the target output of the fuel cell stack 1.

A steady target wet state setting unit 120 sets the range of the wet state of the electrolyte membrane required when the fuel cell system 100 is steadily operated at the target output, i.e. the range of the targeted wet state of the electrolyte membrane, based on the target output. Specifically, the target upper-limit wet state and the target lower-limit wet state are calculated based on the target output with reference to FIG. 3 and the range of the targeted wet state of the electrolyte membrane is set.

A delay processing unit 130 applies a delay process to the target upper-limit wet state and the target lower-limit wet state to cause a change in the wet state of the electrolyte membrane to match the transient property of the wet state of the electrolyte membrane. The delay process is a process for limiting and outputting a change rate per unit time by suppressing high frequency components included in an input and means a primary delay process and a secondary delay process. The content of the delay process is not particularly limited as long as it matches the transient property of the wet state of the electrolyte membrane. The target upper-limit wet state and target lower-limit target lower-limit wet state to which the delay process is applied in this delay processing unit 130 are referred to as a "delayed target upper-limit wet state" and a "delayed target lower-limit wet state" below.

Here, the transient property of the wet state of the electrolyte membrane differs between a case where a control is executed to dry the electrolyte membrane and a case where a control is executed to wet the electrolyte membrane. This is because a rate of change of the moisture content in the electrolyte membrane differs between a case where the moisture content is increased (case where the electrolyte membrane is wetted) and a case where the moisture content is decreased (case where the electrolyte membrane is dried). To put it briefly, it takes longer time to dry the electrolyte membrane than to wet the electrolyte membrane.

Further, when it is tried to control the wet state of the electrolyte membrane relatively at a dry side by the feedback control of the internal resistance, if the control to decrease the moisture content in the electrolyte membrane overshoots and a state at a drier side than the target wet state is reached, it leads to the deterioration of the electrolyte membrane. This is a more serious problem than overshooting to a wetter side than the target wet state.

Thus, it takes longer time to bring the wet state of the electrolyte membrane within the range of the targeted wet state of the electrolyte membrane when the moisture content in the electrolyte membrane is decreased than when the moisture content is increased. It is better to delay a convergence time toward the dry side in consideration of overshooting.

Accordingly, in the delay processing unit 130, a delay time in the case of decreasing the moisture content in the electrolyte membrane is set longer than that in the case of increasing the moisture content in accordance with such a transient property of the wet state of the electrolyte membrane. Here, a longer delay time means to make a time constant of primary delay larger in the case of performing the primary delay process as the delay process and means a process to make a change rate per unit time smaller. In this way, the wet state of the electrolyte membrane can be accurately changed to match the transient property thereof.

A transient target internal resistance setting unit 140 calculates a target upper limit value (hereinafter, referred to as "transient target upper-limit internal resistance) and a target lower limit value (hereinafter, referred to as "transient target lower-limit internal resistance) of the internal resistance during the transient operation of the fuel cell system 100 based on the delayed target upper-limit wet state and the delayed target lower-limit wet state with reference to FIG. 2. That is, the transient target internal resistance setting unit 140 converts the delayed target upper-limit wet state and the delayed target lower-limit wet state into the transient target upper-limit internal resistance and the transient target lower-limit internal resistance.

An operation amount control unit 150 controls the flow rate of the cathode gas so that the internal resistance falls between the transient target upper-limit internal resistance and the transient target lower-limit internal resistance.

A reason why the transient target internal resistance setting unit 140 is provided after the delay processing unit 130, i.e. a conversion process is performed after the delay process is described below with reference to FIGS. 5 and 6.

Figure 5:
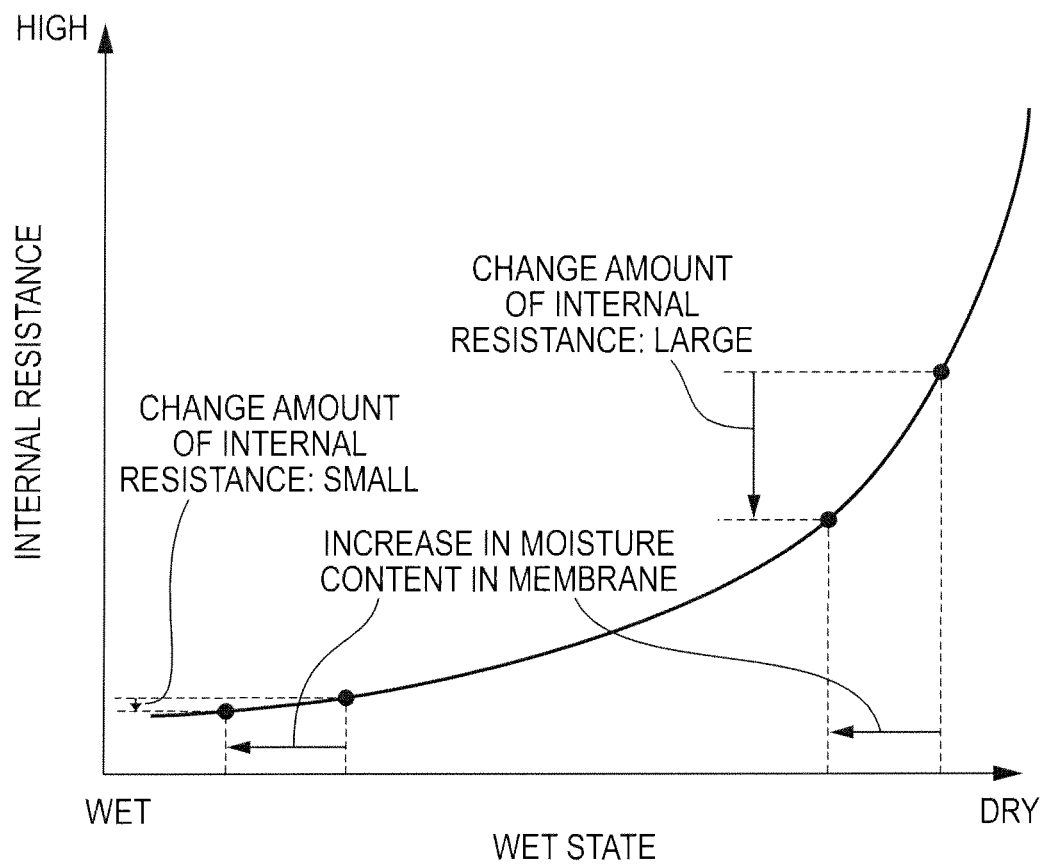
FIG. 5 is a graph, similar to FIG. 2, showing a relationship between the wet state of the electrolyte membrane and the internal resistance of the fuel cell stack.

FIG. 5 is a graph, similar to FIG. 2, showing a relationship between the wet state of the electrolyte membrane and the internal resistance of the fuel cell stack 1. FIG. 6 is a graph showing a difference between a case where the conversion process is performed before the delay process and a case where the conversion process is performed after the delay process.

As shown in FIG. 5, when a case where the moisture content in the membrane is low and a case where it is high are compared, a change amount of the internal resistance differs even if the moisture content in the electrolyte membrane is increased by the same amount. Specifically, the change amount of the internal resistance is larger when the moisture content in the membrane is increased in a state where the moisture content in the electrolyte membrane is low (state where the electrolyte membrane is dry) than when the moisture content in the membrane is increased in a state where the moisture content in the electrolyte membrane is high (state where the electrolyte membrane is wet).

As just described, a relationship in which the internal resistance changes with a nonlinear characteristic in relation to a change in the wet state of the electrolyte membrane holds between the wet state of the electrolyte membrane and the internal resistance.

Figure 6:
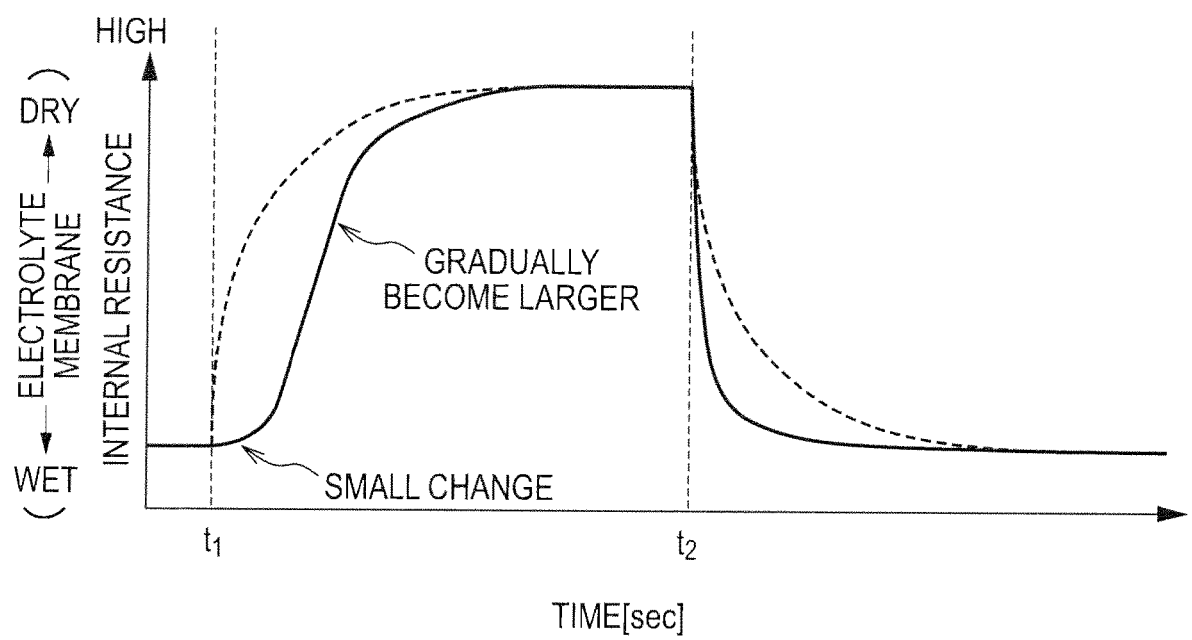
FIG. 6 is a graph showing a difference between a case where a conversion process was performed before a delay process and a case where the convention process was performed after the delay process, FIG. 7 are graphs showing an effect of the electrolyte membrane wet state control according to this embodiment.

Thus, as shown in solid line in FIG. 6, such a nonlinear characteristic can be reproduced when the moisture content in the membrane is decreased in a state where the moisture content in the electrolyte membrane is high at time t1 if the conversion process is performed after the delay process. That is, a change of the internal resistance can be made small at first and can be gradually increased with a decrease in the moisture content in the membrane.

On the other hand, when the conversion process is performed before the delay process, if the content of the delay process is, for example, the primary delay process, it is a simple primary delay process and such a nonlinear characteristic cannot be reproduced as shown in broken line in FIG. 6.

Also when the moisture content in the membrane is increased in the state where the moisture content in the electrolyte membrane is low at time t2, a change of the internal resistance can be made large at first and can be gradually reduced with an increase in the moisture content in the membrane if the conversion process is performed after the delay process.

In this way, a change in the wet state of the electrolyte membrane can be caused to accurately match the transient property of the wet state of the electrolyte membrane.

Figure 7:
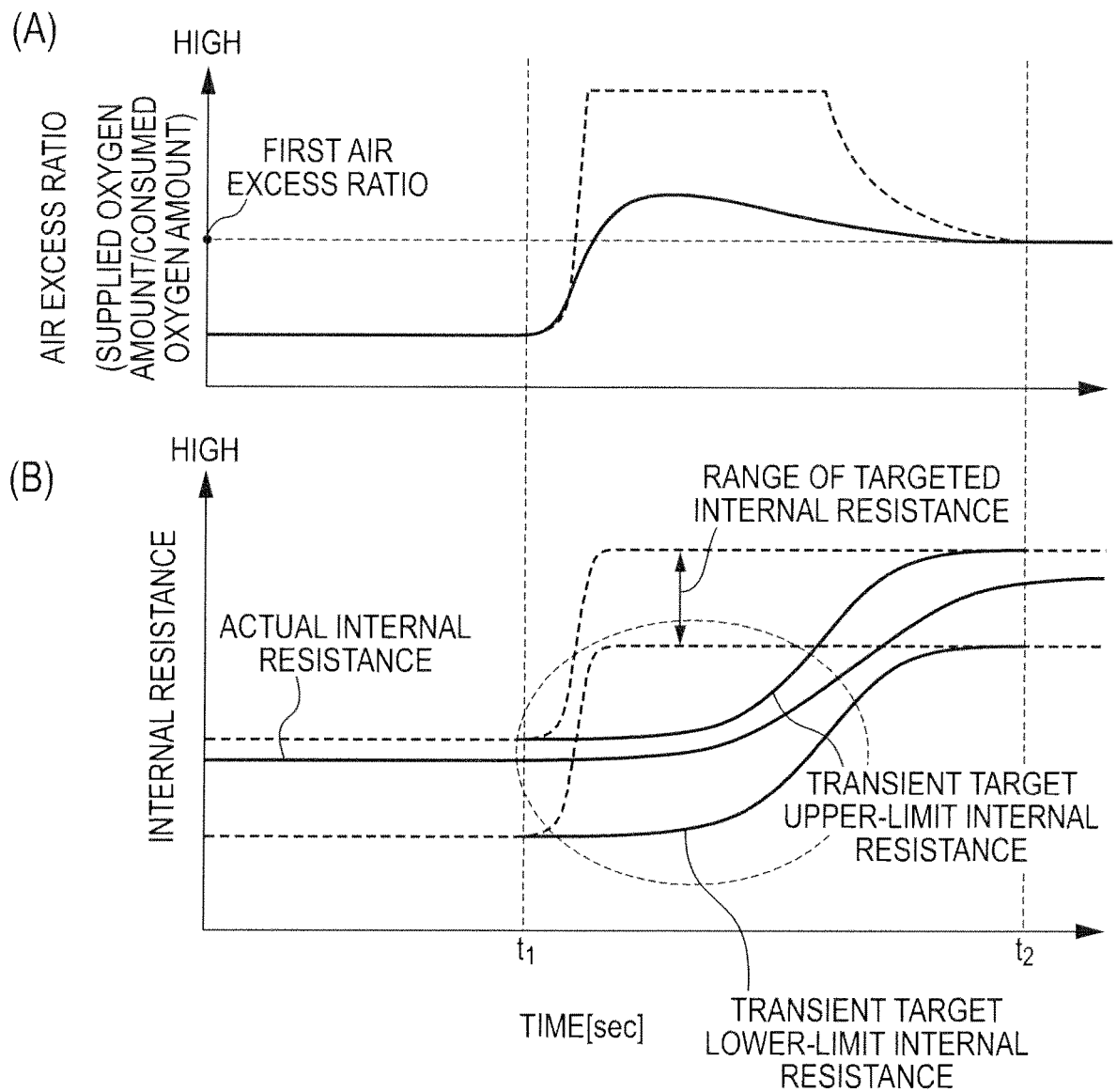

FIG. 7 are graphs showing an effect of the electrolyte membrane wet state control according to this embodiment. FIG. 7(A) shows the air excess ratio and FIG. 7(B) shows the internal resistance of the fuel cell stack 1.

When the accelerator operation amount decreases and the target output of the fuel cell stack 1 decreases at time t1, the range of the targeted wet state of the electrolyte membrane changes according to a change of the target output and the range of the targeted internal resistance changes as shown in broken line in FIG. 7(B).

At this time, in this embodiment, the delay process is applied to the target upper-limit wet state and the target lower-limit wet state, which are upper and lower limits of the range of the targeted wet state of the electrolyte membrane, considering that the wet state of the electrolyte membrane changes at a later timing than the output of the fuel cell stack 1.

Then, the transient target upper-limit internal resistance and the transient target lower-limit internal resistance are calculated as shown in solid line in FIG. 5(B) based on the delayed target upper-limit wet state and the delayed target lower-limit wet state, considering that the internal resistance changes with a nonlinear characteristic in relation to a change in the wet state of the electrolyte membrane.

In this way, the target range of the internal resistance matching the transient property of the wet state of the electrolyte membrane can be set during the transient operation of the fuel cell system 100.

Thus, it can be prevented that the air excess ratio becomes excessively larger than the first air excess ratio and the cathode gas is excessively supplied in the time interval between time t1 and time t2. Therefore, it is possible to improve one or both of fuel economy and sound vibration performance during the transient operation of the fuel cell system 100.

Here, a part enclosed in broken line in FIG. 7(B) is thought to be possibly problematic since the internal resistance deviates from the range of the targeted internal resistance.

However, since the temperature of the fuel cell stack 1 is transiently high when the target output is reduced, the moisture content in the electrolyte membrane is preferably somewhat higher than the moisture content in the membrane required when the fuel cell system 100 is steadily operated at the target output. That is, when the target output decreases, the internal resistance is preferably transiently lower than the internal resistance required when the fuel cell system 100 is steadily operated at the target output.

Accordingly, even if the internal resistance deviates from the range of the targeted internal resistance as in this embodiment, it is not problematic or rather preferable.

According to this embodiment described above, a change rate of the wet state of the electrolyte membrane is limited, considering that the wet state of the electrolyte membrane changes at a later timing than the output of the fuel cell stack 1.

Specifically, the delay process is applied to the target upper-limit wet state and the target lower-limit wet state. Then, the delay time when the target output of the fuel cell stack 1 is changed to dry the electrolyte membrane is set longer than that when it is changed to wet the electrolyte membrane.

In this way, operation amounts (flow rate and pressure of the cathode gas, cooling water temperature) capable of adjusting the wet state of the electrolyte membrane can be controlled to match the transient property of the wet state of the electrolyte membrane. Thus, transient sharp fluctuations of these operation amounts can be suppressed during the transient operation of the fuel cell system 100. Therefore, the deterioration of one or both of fuel economy and sound vibration performance during the transient operation can be suppressed.

Further, in this embodiment, the transient target upper-limit internal resistance and the transient target lower-limit internal resistance are calculated based on the delayed target upper-limit wet state and the delayed target lower-limit wet state, considering that the internal resistance changes with a nonlinear characteristic in relation to a change in the wet state of the electrolyte membrane.

In this way, when the moisture content in the membrane is decreased in a state where the moisture content in the electrolyte membrane is high, the operation amounts capable of adjusting the wet state of the electrolyte membrane can be so controlled that a change in the wet state of the electrolyte membrane becomes gradually larger with a decrease in the moisture content in the membrane.

On the other hand, when the moisture content in the membrane is increased in a state where the moisture content in the electrolyte membrane is low, the operation amounts capable of adjusting the wet state of the electrolyte membrane can be so controlled that a change in the wet state of the electrolyte membrane becomes gradually smaller with an increase in the moisture content in the membrane.

Thus, the wet state of the electrolyte membrane can be changed to more accurately match the transient property of the wet state of the electrolyte membrane. This can suppress transient sharp fluctuations of those operation amounts during the transient operation of the fuel cell system 100. Therefore, the deterioration of one or both of fuel economy and sound vibration performance during the transient operation can be suppressed.

Second Embodiment

Next, a second embodiment of the present invention is described. This embodiment differs from the first embodiment in that the delay process and the conversion process are simultaneously performed. The following description is centered on that point of difference. It should be noted that, in each of the following embodiments, parts achieving similar functions as in the first embodiment are denoted by the same reference signs and repeated description is omitted as appropriate.

Figure 8:
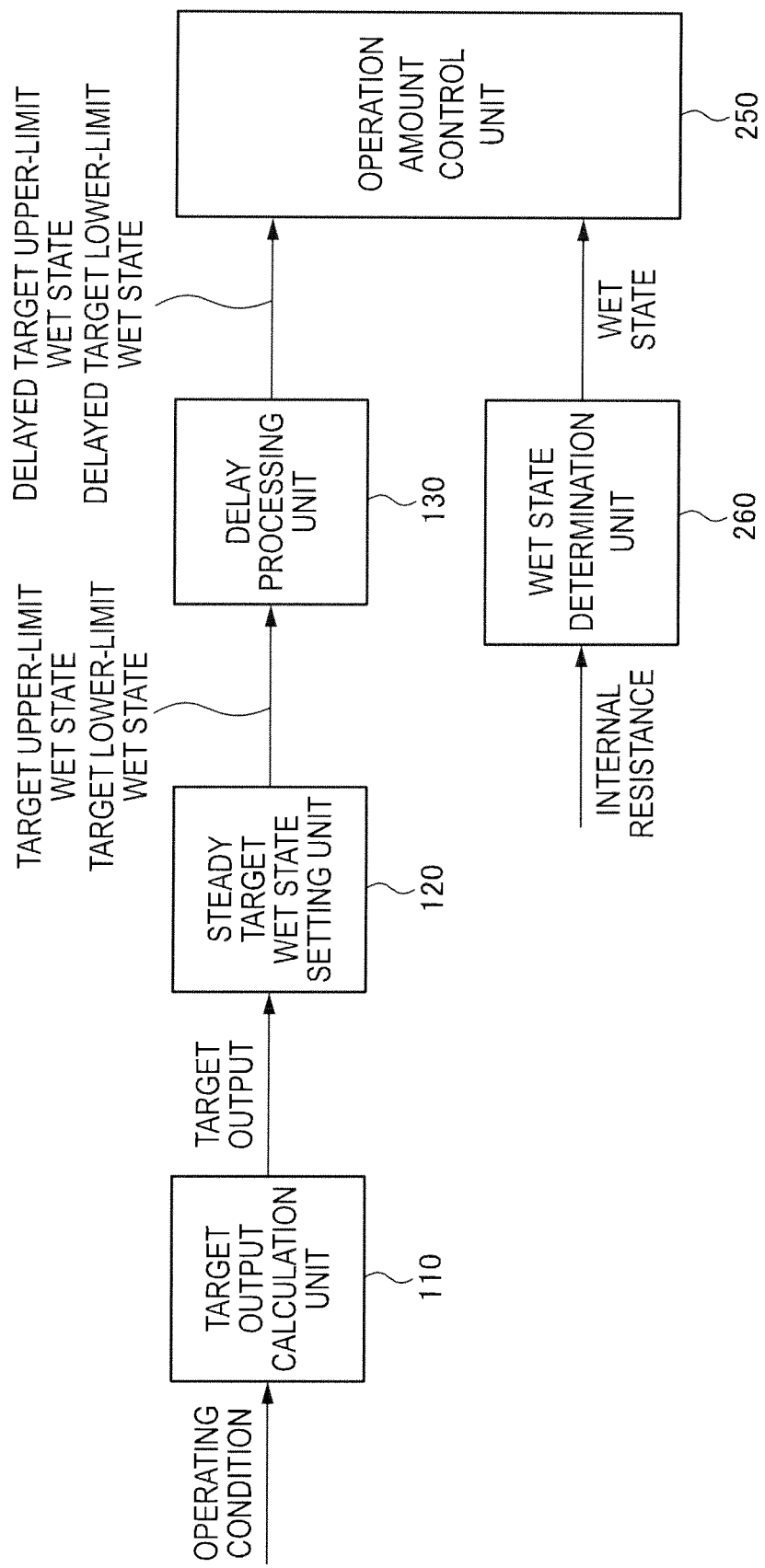
FIG. 8 is a block diagram showing an electrolyte membrane wet state control according to the second embodiment.

FIG. 8 is a block diagram showing an electrolyte membrane wet state control according to the second embodiment of the present invention.

A wet state determination unit 260 determines the present wet state of the electrolyte membrane based on detected internal resistance with reference to FIG. 2.

An operation amount control unit 250 controls the flow rate of a cathode gas so that the wet state of the electrolyte membrane determined in a wet state determination unit 210 falls between a target upper-limit wet state and a target lower-limit wet state to which a delay process was applied.

Although the wet state of the electrolyte membrane is converted into the internal resistance in the first embodiment, the internal resistance may be conversely converted into the wet state of the electrolyte membrane in this way.

According to this embodiment described above, an effect similar to that of the first embodiment is obtained and the delay process and the conversion process can be simultaneously performed.

Third Embodiment

Next, a third embodiment of the present invention is described. This embodiment differs from the first embodiment in that the process of controlling the wet state of the electrolyte membrane is simplified. The following description is centered on that point of difference.

Figure 9:
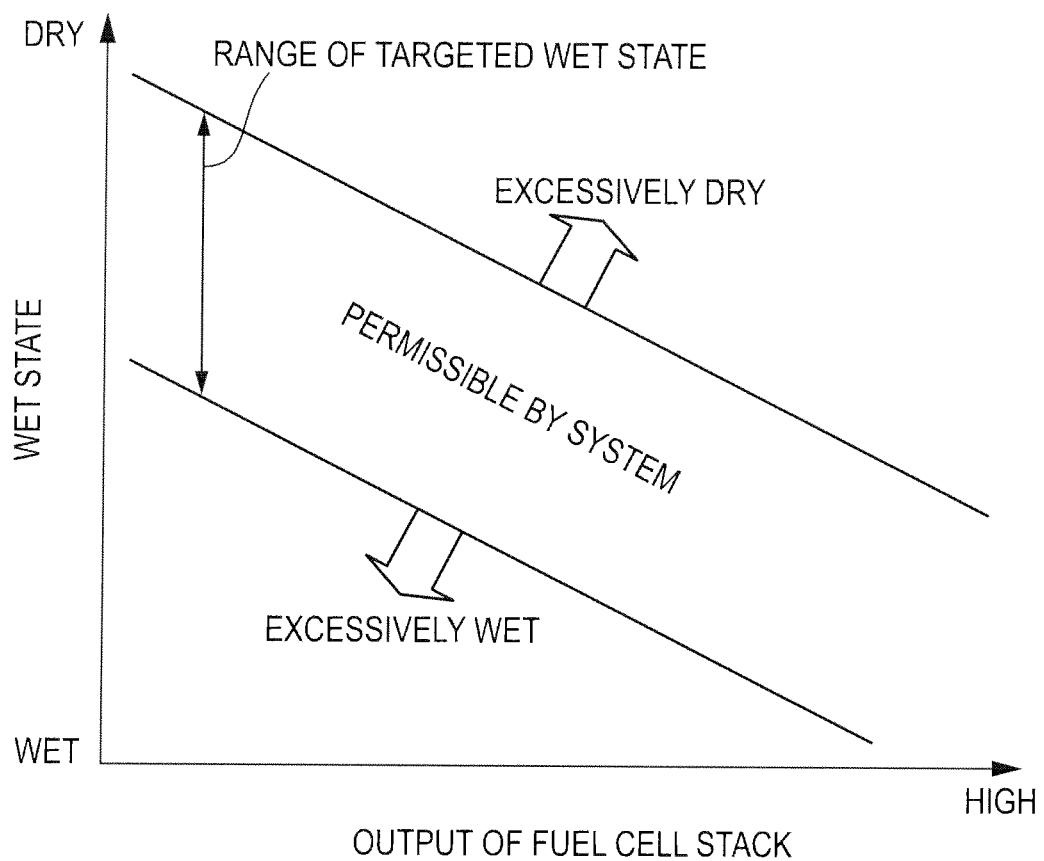
FIG. 9 is a graph showing a range of a targeted wet state of an electrolyte membrane according to the third embodiment in relation to an output of the fuel cell stack.

FIG. 9 is a graph showing a range of a targeted wet state of an electrolyte membrane according to this embodiment in relation to an output of the fuel cell stack 1.

In the first embodiment, it is assumed as shown in FIG. 3 that the targeted wet state of the electrolyte membrane nonlinearly changes according to the output of the fuel cell stack 1. However, as shown in FIG. 9, the targeted wet state of the electrolyte membrane may linearly change according to the output of the fuel cell stack 1.

In this case, the steady target wet state setting unit 120 can be omitted in the electrolyte membrane wet state control of the first embodiment. This point is described below.

Figure 10:
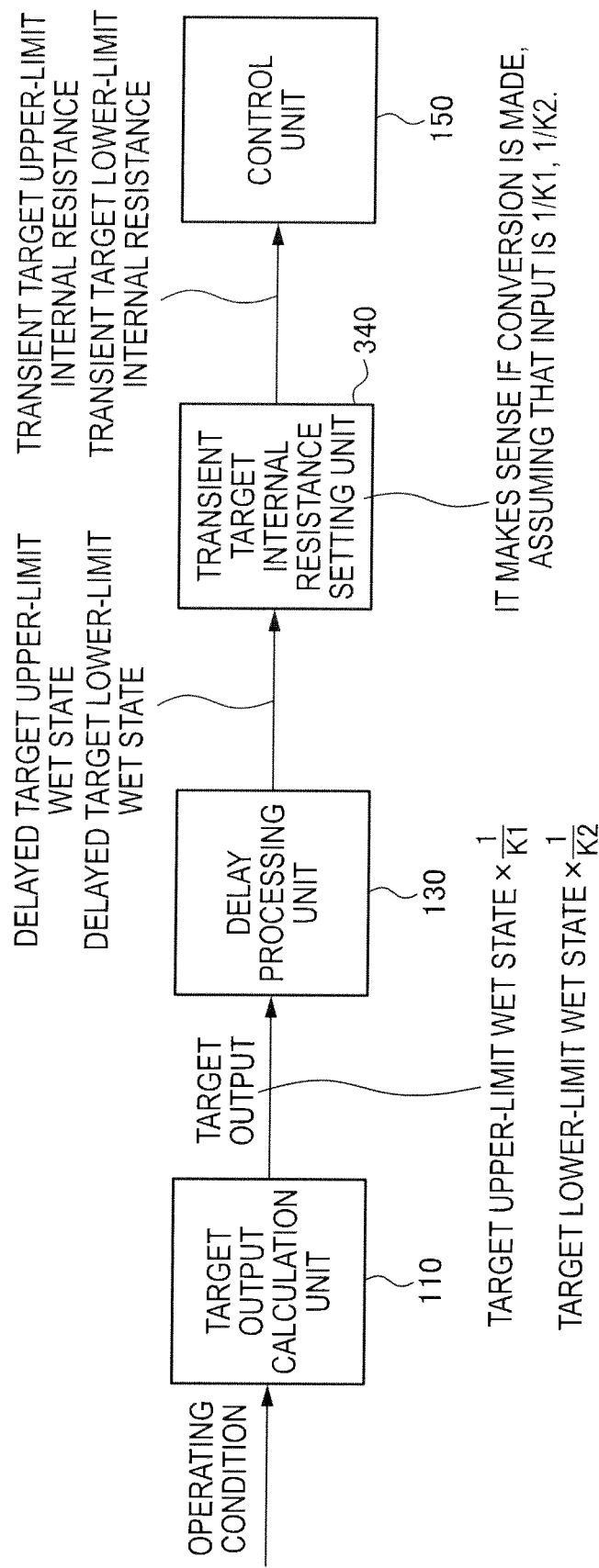
FIG. 10 is a block diagram showing an electrolyte membrane wet state control according to the third embodiment.

FIG. 10 is a block diagram showing an electrolyte membrane wet state control according to the third embodiment of the present invention.

When the range of the targeted wet state of the electrolyte membrane linearly changes according to the output of the fuel cell stack 1, a target upper-limit wet state and a target lower-limit wet state calculated based on a target output with reference to FIG. 9 are merely multiplication of the target output and predetermined coefficients k1, k2 and the following equations (3) and (4) hold.

$$\text{Target Upper-Limit Wet State} = k1 \times \text{target output} \quad (3)$$

$$\text{Target Lower-Limit Wet State} = k2 \times \text{target output} \quad (4)$$

Accordingly, if the target output is directly input to a delay processing unit 130, this is the same as the input of multiplication of the target upper-limit wet state, the target lower-limit wet state and 1/k1, 1/k2. As a result, outputs of the delay process are products of the delayed target upper-limit wet state, delayed the target lower-limit wet state and 1/k1, 1/k2.

Figure 11A:
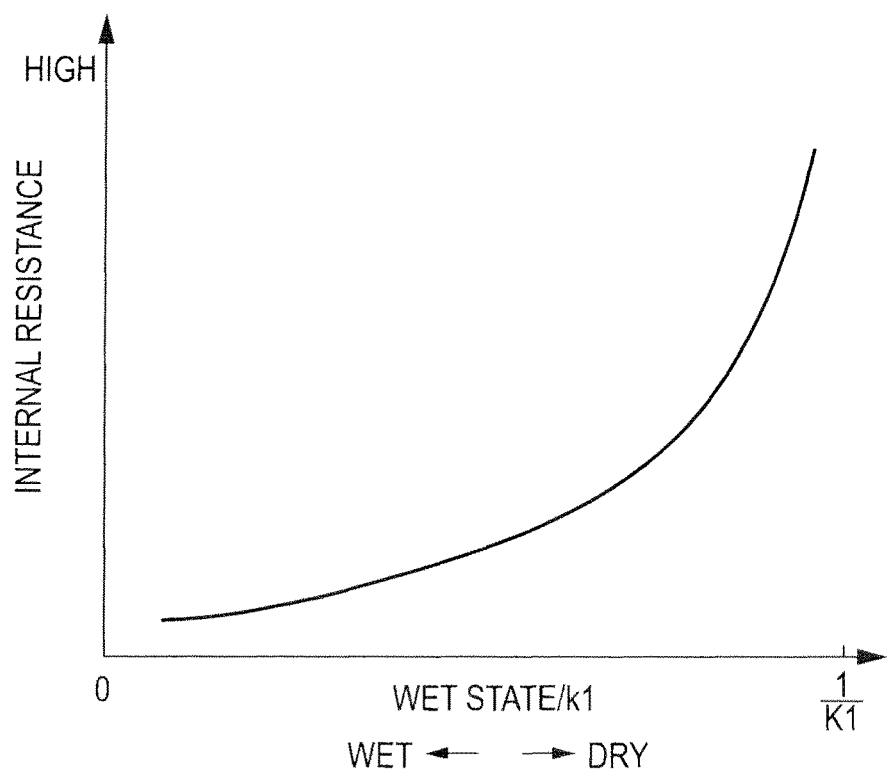
FIG. 11A is a table for calculating internal resistance of the fuel cell stack based on a wet state of a used electrolyte membrane in a transient target internal resistance setting unit according to the third embodiment.
Figure 11B:
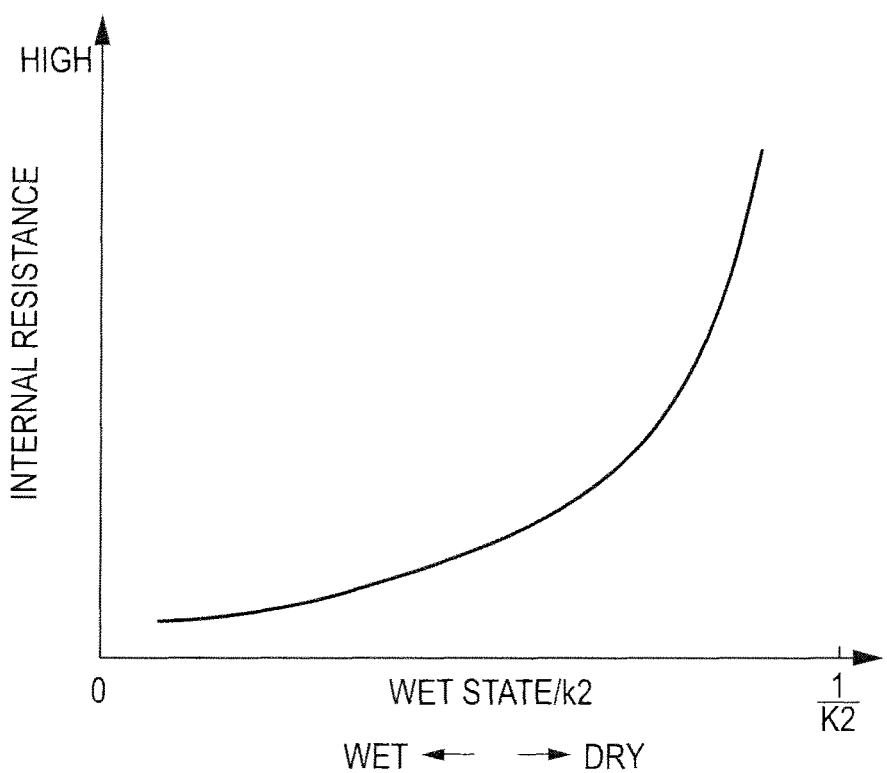
FIG. 11B is a table for calculating the internal resistance of the fuel cell stack based on the wet state of the used electrolyte membrane in the transient target internal resistance setting unit according to the third embodiment.

Thus, in this embodiment, the delayed target upper-limit wet state is converted into transient target upper-limit internal resistance based on a product of the wet state on a horizontal axis and 1/k1 as shown in FIG. 11A in a transient target internal resistance setting unit 340. In FIG. 11A, 1/k1 is reached when the electrolyte membrane is in a completely dry state. Further, the delayed target lower-limit wet state is converted into transient target lower-limit internal resistance based on a multiplication of the wet state on the horizontal axis and 1/k2 as shown in FIG. 11B. In FIG. 11B, 1/k2 is reached when the electrolyte membrane is in a completely dry state.

In this way, even if the target output is directly input to the delay processing unit 130, the transient target upper-limit internal resistance and the transient target lower-limit internal resistance can be calculated without any problem.

According to this embodiment described above, an effect similar to that of the first embodiment is obtained and, in addition, the content of the process can be simplified as compared with the first embodiment.

Fourth Embodiment

Next, a fourth embodiment of the present invention is described. This embodiment differs from the first embodiment in that the flow rate of the cathode gas is directly controlled. The following description is centered on that point of difference.

Figure 12:
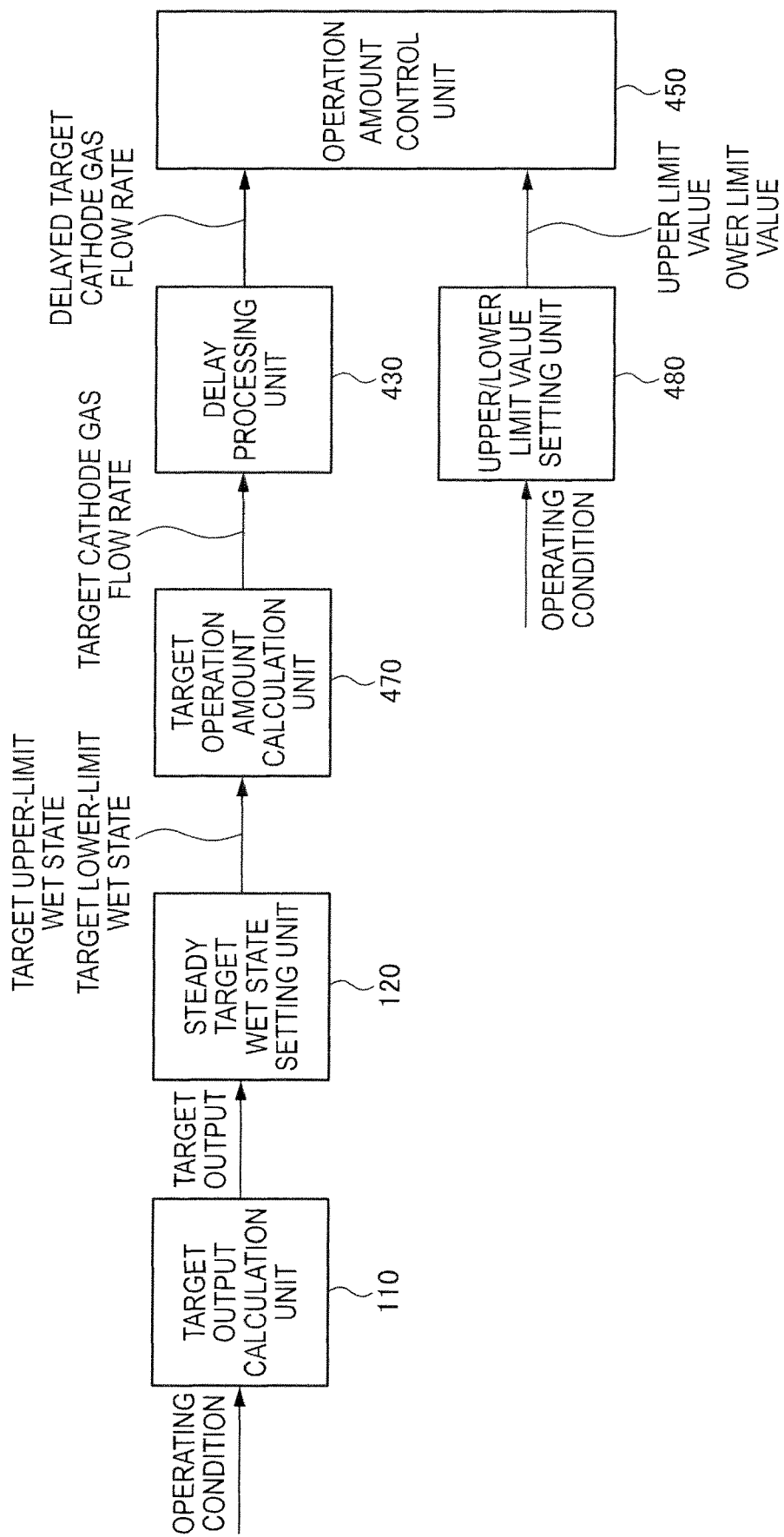
FIG. 12 is a block diagram showing an electrolyte membrane wet state control according to the fourth embodiment.

FIG. 12 is a block diagram showing an electrolyte membrane wet state control according to the fourth embodiment of the present invention.

A target operation amount calculation unit 470 calculates a target value of a cathode gas flow rate necessary to bring a wet state of an electrolyte membrane within a range of a targeted wet state of the electrolyte membrane (hereinafter, referred to as a "target cathode gas flow rate").

A delay processing unit 430 applies a delay process to the target cathode gas flow rate to calculate a delayed target cathode gas flow rate.

An upper/lower limit value setting unit 480 sets an upper limit value and a lower limit value of the target cathode gas flow rate based on an output of the fuel cell stack 1. Specifically, these are set as follows.

Figure 13:
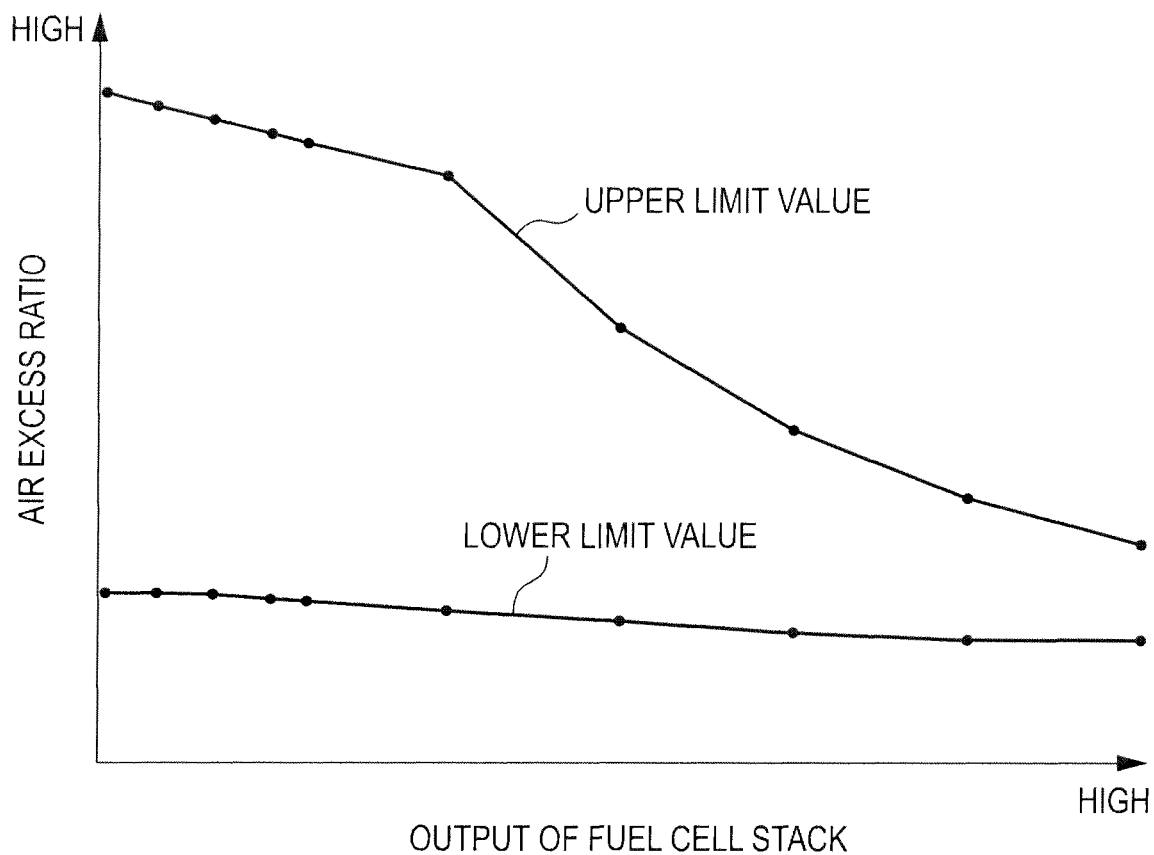
FIG. 13 is a graph showing one setting example when an upper limit and a lower limit of an air excess ratio are set based on an output of a fuel cell stack, FIG. 14 are graphs showing an effect of the electrolyte membrane wet state control according to the fourth embodiment.

FIG. 13 is a graph showing one setting example when an upper limit and a lower limit of an air excess ratio are set based on the output of the fuel cell stack 1.

In the upper/lower limit value setting unit 480, the upper and lower limits of the air excess ratio are set based on the output of the fuel cell stack 1 with reference to FIG. 13. Then, the upper and lower limit values of the target cathode gas flow rate are set based on the set upper and lower limits of the air excess ratio. In FIG. 13, the upper limit of the air excess ratio is set in consideration of fuel economy and sound vibration performance. The lower limit of the air excess ratio is set so as not to cause flooding.

In an operation amount control unit 450, the cathode gas flow rate is controlled based on a delayed target cathode gas operation amount. At this time, if the delayed target cathode gas flow rate is higher than the upper limit value, the cathode gas flow rate is controlled so as not to exceed the upper limit value. On the other hand, if the delayed target cathode gas flow rate is lower than the lower limit value, the cathode gas flow rate is controlled so as not to fall below the lower limit value.

Figure 14:
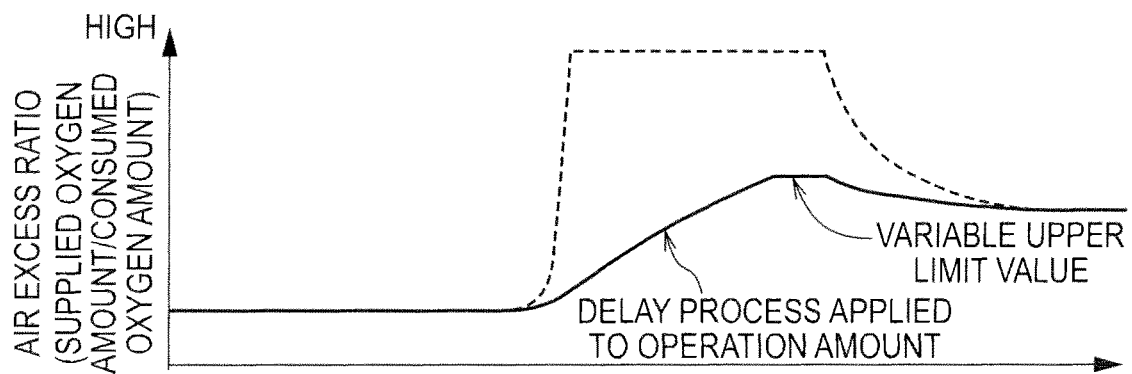
Figure 14:
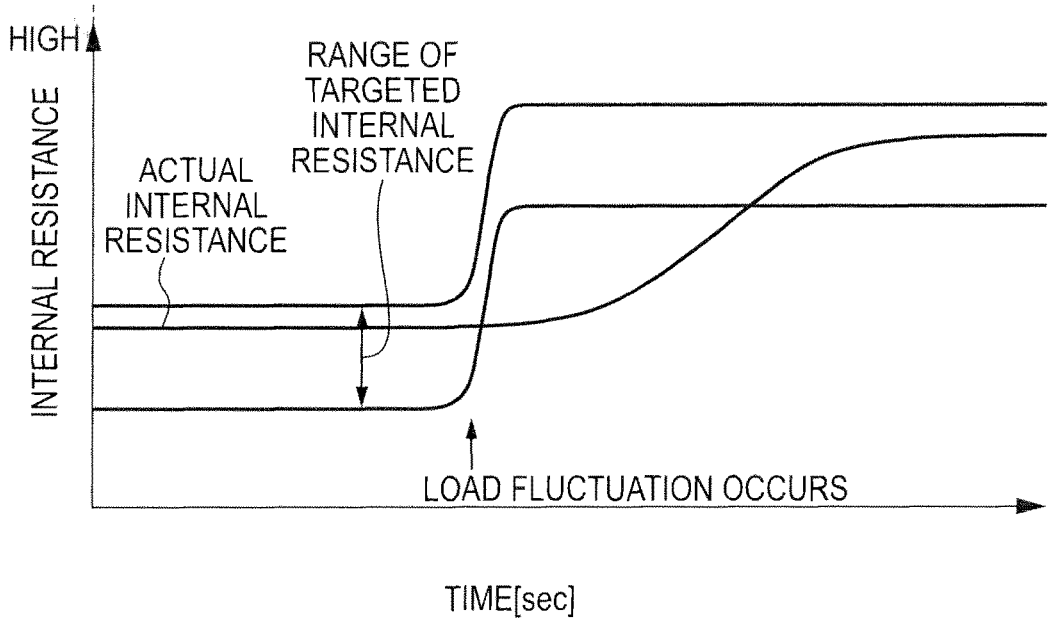

FIG. 14 are graphs showing an effect of the electrolyte membrane wet state control according to this embodiment. FIG. 14(A) shows the air excess ratio and FIG. 14(B) shows the internal resistance of the fuel cell stack 1.

As shown in FIG. 14(A), the flow rate of the cathode gas is directly controlled in accordance with a transient property of the electrolyte membrane in this embodiment. This can prevent the cathode gas from being excessively supplied and suppress the deterioration of one or both of fuel economy and sound vibration performance even if a difference between the internal resistance and the targeted internal resistance increases during the transient operation of the fuel cell system 100 as shown in FIG. 14(B).

According to this embodiment described above, a change in the cathode gas flow rate can be directly limited when the wet state of the electrolyte membrane is controlled to fall within the range of the targeted wet state of the electrolyte membrane. Since this can reliably prevent the supply of the cathode gas at an excessive flow rate, the deterioration of one or both of fuel economy and sound vibration performance can be suppressed.

Although the embodiments of the present embodiment have been described above, the above embodiments are merely some of application examples of the present invention and not of the nature to limit the technical scope of the present invention to the specific configurations of the above embodiments.

For example, although the flow rate of the cathode gas is directly controlled in the fourth embodiment, the pressure of the cathode gas or the temperature of the cooling water may be controlled.

Figure 15:
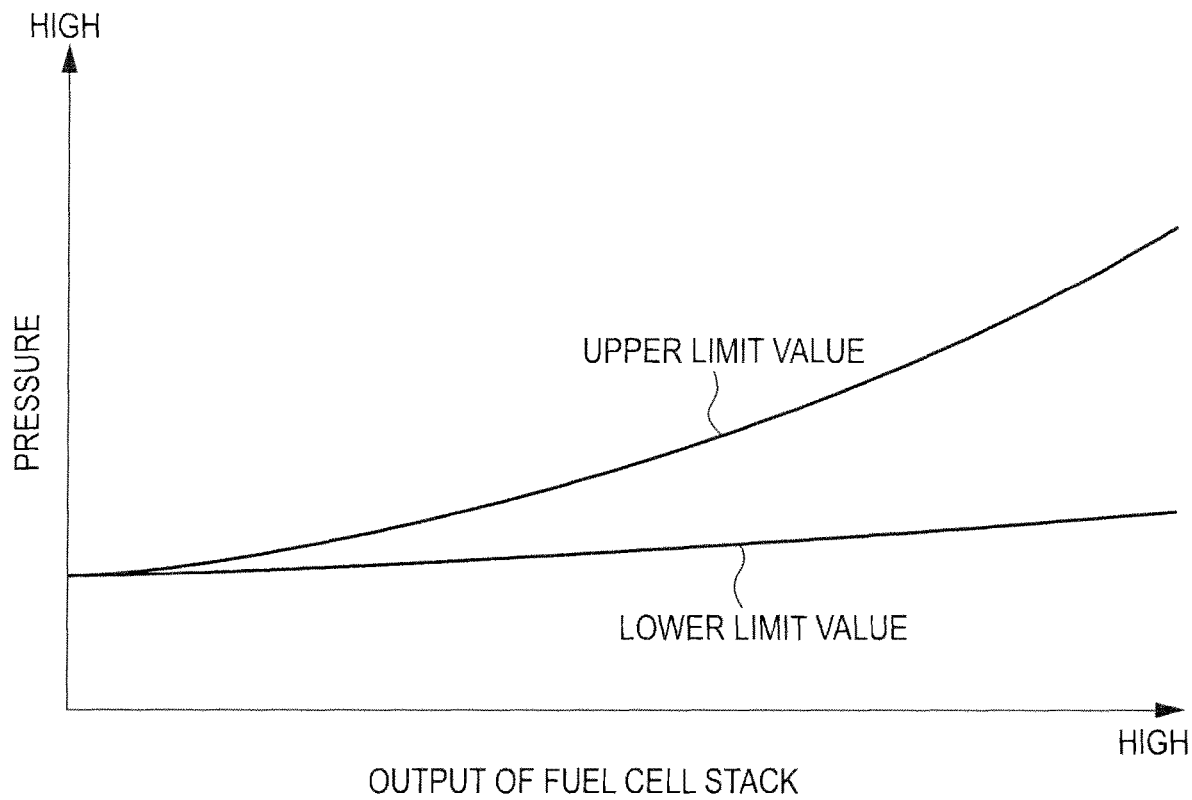
FIG. 15 is a graph showing one setting example when an upper limit and a lower limit of a cathode gas pressure are set based on an output of the fuel cell stack, and FIG. 16 are graphs showing a problem which occurs during a transient operation of a fuel cell system.

In the case of controlling the pressure of the cathode gas, an upper limit and a lower limit of the pressure of the cathode gas can be set with reference to FIG. 15. In FIG. 15, the upper limit of the pressure of the cathode gas is set in consideration of component pressure resistance and fuel economy. The lower limit of the pressure of the cathode gas is set not to excessively increase a pressure loss and not to reduce output efficiency of the fuel cell stack 1.

In the case of controlling the temperature of the cooling water, an upper limit and a lower limit are not changed according to the output of the fuel cell system 100, but the upper limit is set in consideration of the deterioration of fuel cells (tendency to deteriorate a catalyst and electrolyte membranes with a temperature increase). The lower limit is set in consideration of the output of the fuel cell stack 1 (efficiency decreases with a temperature decrease).

The present application claims a priority based on Japanese Patent Application No. 2011-043862 filed with the Japan Patent Office on Mar. 1, 2011, all the contents of which are hereby incorporated by reference.

The invention claimed is:

1. A fuel cell system for generating power by supplying a reaction gas to a fuel cell, comprising:
   a wet state detection unit configured to detect a wet state of an electrolyte membrane of the fuel cell, wherein the wet state of the electrolyte membrane corresponds to a degree of moisture in the electrolyte membrane;
   an accelerator stroke sensor configured to detect an accelerator operation amount based on a depression of an accelerator pedal;
   a controller; and
   a device configured to adjust a flow rate of a reaction gas;
   wherein the controller is programmed to:
      set a target output of the fuel cell based on the accelerator operation amount detected by the accelerator stroke sensor;
      set a steady time target wet state of the electrolyte membrane during a steady operation of the fuel cell based on an operating condition and the target output of the fuel cell;
      set a next target output of the fuel cell when the accelerator operation amount detected by the accelerator stroke sensor is changed;
      set a transient time target wet state of the electrolyte membrane during a transient operation based on the next target output, the transient operation being an operation state in which an actual output of the fuel cell is changing from the target output to the next target output;
      set the flow rate of the reaction gas based on the steady time target wet state or the transient time target wet state; and
      set the transient time target wet state such that a rate of change of the transient time target wet state is smaller than a rate of change of a wet state according to a change rate of the output from the target output to the next target output, and
   wherein the wet state detection unit includes an internal resistance detector configured to detect an internal resistance of the fuel cell and detects the wet state of the electrolyte membrane based on the internal resistance of the fuel cell detected by the internal resistance detector from a correlation between the wet state of the electrolyte membrane of the fuel cell and the internal resistance of the fuel cell.

2. The fuel cell system according to claim 1, wherein the controller sets the transient time target wet state in consideration of one or both of fuel economy and sound vibration during the transient operation of the fuel cell system.

3. The fuel cell system according to claim 1, wherein the controller sets the transient time target wet state by applying a process of limiting the change rate of the steady time target wet state of the electrolyte membrane with respect to the steady time target wet state.

4. The fuel cell system according to claim 1, wherein the controller limits the change rate of the transient time target wet state by applying a delay process to the steady time target wet state.

5. The fuel cell system according to claim 3, wherein the controller makes the change rate of the transient time target wet state smaller when the wet state is controlled to dry the electrolyte membrane than when the wet state is controlled to wet the electrolyte membrane.

6. The fuel cell system according to claim 1, wherein the controller is programmed to set the steady time target wet state as the target wet state during the steady operation of the fuel cell system, setting the transient time target wet state as the target wet state during the transient operation of the fuel cell system and controlling the wet state of the electrolyte membrane based on the set target wet state and the wet state of the electrolyte membrane.

7. The fuel cell system according to claim 6, wherein the controller is further programmed to:
   calculate a target operation amount, which is a target value of an operation amount capable of adjusting the wet state of the electrolyte membrane, based on the set target wet state;
   set an upper limit value and a lower limit value of the target operation amount based on the operating condition of the fuel cell system; and
   control the operation amount to fall within a range between the upper and lower limit values of the target operation amount.

8. The fuel cell system according to claim 1, wherein:
   the controller sets the transient time target wet state by applying a process of limiting the change rate of the steady time target wet state of the electrolyte membrane with respect to the steady time target wet state; and
   the controller is further programmed to:
      set transient time internal resistance based on the transient time target wet state from the correlation between the wet state of the electrolyte membrane and the internal resistance of the fuel cell, and control an operation amount capable of adjusting the wet state of the electrolyte membrane such that the internal resistance of the fuel cell becomes the transient time internal resistance.

9. The fuel cell system according to claim 8, wherein the correlation is a relationship in which the internal resistance changes with a nonlinear characteristic in relation to a change in the wet state of the electrolyte membrane.

10. A fuel cell system for generating power by supplying a reaction gas to a fuel cell, comprising:
a wet state detection unit configured to detect a wet state of an electrolyte membrane of the fuel cell, wherein the wet state of the electrolyte membrane corresponds to a degree of moisture in the electrolyte membrane;
an accelerator stroke sensor configured to detect an accelerator operation amount based on a depression of an accelerator pedal; and
a controller programmed to:
set a target output of the fuel cell based on the accelerator operation amount detected by the accelerator stroke sensor;
set a steady time target wet state of the electrolyte membrane during a steady operation of the fuel cell system based on an operating condition and the target output of the fuel cell;
calculate a target operation amount, which is a target value of an operation amount capable of adjusting the wet state of the electrolyte membrane, based on the steady time target wet state of the electrolyte membrane;
set a next target output of the fuel cell when the accelerator operation amount detected by the accelerator stroke sensor is changed; and
adjust the degree of moisture in the electrolyte membrane by
setting a transient time target wet state when the next target output of the fuel cell is set, and
calculating a transient time target operation amount, which is a value of an operation amount capable of adjusting the wet state of the electrolyte membrane from the steady time target wet state to the transient time target wet state, by applying a process of limiting a change rate of the target operation amount such that the wet state of the electrolyte membrane gradually changes at a different rate than a rate at which an output of the fuel cell changes from the target output to the next target output during a transient operation in which an actual output of the fuel cell changes from the target output of the fuel cell to the next target output of the fuel cell,
wherein the wet state detection unit includes an internal resistance detector configured to detect an internal resistance of the fuel cell and detects the wet state of the electrolyte membrane based on the internal resistance of the fuel cell detected by the internal resistance detector from a correlation between the wet state of the electrolyte membrane of the fuel cell and the internal resistance of the fuel cell.

11. The fuel cell system according to claim 1, wherein the controller is programmed to limit the change rate of the steady time target wet state or the change rate of the transient time target wet state by limiting a flow rate or a pressure of a cathode gas in the fuel cell.

12. The fuel cell system according to claim 1, wherein the controller is programmed to limit the change rate of the steady time target wet state or the change rate of the transient time target wet state by limiting a temperature of a cooling water in the fuel cell.

13. The fuel cell system according to claim 10, wherein the controller is programed to apply the process of limiting the change rate of the target operation amount by limiting a flow rate or a pressure of a cathode gas in the fuel cell.

14. The fuel cell system according to claim 10, wherein the controller is programed to apply the process of limiting the change rate of the target operation amount by limiting a temperature of a cooling water in the fuel cell.

15. A fuel cell system for generating power by supplying a reaction gas to a fuel cell, comprising:
a wet state detection unit configured to detect a wet state of an electrolyte membrane of the fuel cell, wherein the wet state of the electrolyte membrane corresponds to a degree of moisture in the electrolyte membrane;
an accelerator stroke sensor configured to detect an accelerator operation amount based on a depression of an accelerator pedal; and
a controller programmed to:
set a target output of the fuel cell based on the accelerator operation amount detected by the accelerator stroke sensor;
set a steady time target wet state of the electrolyte membrane during a steady operation of the fuel cell based on an operating condition and the target output of the fuel cell;
set a next target output of the fuel cell when the accelerator operation amount detected by the accelerator stroke sensor is changed;
adjust the degree of moisture in the electrolyte membrane by
setting a transient time target wet state when the next target output of the fuel cell is set, and
limiting a change rate of the steady time target wet state or a change rate of the transient time target wet state such that the wet state of the electrolyte membrane gradually changes at a different rate than a rate at which an output of the fuel cell changes from the target output to the next target output during a transient operation in which an actual output of the fuel cell changes from the target output of the fuel cell to the next target output of the fuel cell,
wherein the wet state detection unit includes an internal resistance detector configured to detect an internal resistance of the fuel cell and detects the wet state of the electrolyte membrane based on the internal resistance of the fuel cell detected by the internal resistance detector from a correlation between the wet state of the electrolyte membrane of the fuel cell and the internal resistance of the fuel cell.

16. The fuel cell system according to claim 4, wherein the delay process applied, by the controller, to the steady time target wet state varies depending on whether the degree of moisture in the electrolyte membrane is being decreased or increased such that a delay time in which the electrolyte membrane is being dried is longer than a delay time in which the electrolyte membrane is being wet.

17. The fuel cell system according to claim 1, wherein the reaction gas comprises cathode gas.

18. The fuel cell system according to claim 15, wherein the different rate at which the wet state of the electrolyte membrane gradually changes is lower than the rate at which the output of the fuel cell changes from the target output to the next target output during the transient operation.

19. A fuel cell system for generating power by supplying a reaction gas to a fuel cell, comprising:
- a wet state detection unit configured to detect a wet state of an electrolyte membrane of the fuel cell, wherein the wet state of the electrolyte membrane corresponds to a degree of moisture in the electrolyte membrane;
- an accelerator stroke sensor configured to detect an accelerator operation amount based on a depression of an accelerator pedal;
- a controller; and
- a device configured to adjust a flow rate of a reaction gas;
- wherein the controller is programmed to:
  - set a target output of the fuel cell based on the accelerator operation amount detected by the accelerator stroke sensor;
  - set a steady time target wet state of the electrolyte membrane during a steady operation of the fuel cell based on an operating condition and the target output of the fuel cell;
  - set a next target output of the fuel cell when the accelerator operation amount detected by the accelerator stroke sensor is changed;
  - set a transient time target wet state of the electrolyte membrane during a transient operation based on the next target output, the transient operation being an operation state in which an actual output of the fuel cell is changing from the target output to the next target output;
  - set the flow rate of the reaction gas based on the steady time target wet state or the transient time target wet state; and
  - set the transient time target wet state such that a rate of change of the transient time target wet state is smaller than a rate of change of a wet state according to a change rate of the output from the target output to the next target output, and
- wherein the controller limits the change rate of the transient time target wet state by applying a delay process to the steady time target wet state.

20. The fuel cell system according to claim 19, wherein the delay process applied, by the controller, to the steady time target wet state varies depending on whether the degree of moisture in the electrolyte membrane is being decreased or increased such that a delay time in which the electrolyte membrane is being dried is longer than a delay time in which the electrolyte membrane is being wet.

21. The fuel cell system according to claim 1, wherein the internal resistance detector comprises a DC/DC converter and a voltage sensor.

* * * * *